UNITED STATES PATENT OFFICE.

LOUIS E. BARTON, OF NIAGARA FALLS, NEW YORK, ASSIGNOR, BY MESNE ASSIGNMENTS, TO TITANIUM PIGMENT COMPANY, INC., A CORPORATION OF MAINE.

METHOD OF PRODUCING COMPOSITE TITANIC OXIDE PRODUCTS.

1,409,648.  Specification of Letters Patent.  Patented Mar. 14, 1922.

No Drawing.  Application filed April 23, 1920. Serial No. 376,057.

*To all whom it may concern:*

Be it known that I, LOUIS E. BARTON, a citizen of the United States, and a resident of Niagara Falls, in the county of Niagara, State of New York, have invented a certain new and useful Method of Producing Composite Titanic Oxide Products, of which the following is a specification.

My present invention relates to pigments such as are utilizable, for example, in paint, rubber, linoleum, plastics, and other products, and which comprise titanic particles adherent to, or coalesced with, carrier particles of other suitable material. The objects of my invention comprise provision of methods whereby, with industrial economy and success, are producible such pigments possessed of properties superior to those of their predecessors, as for example, greater hiding power, and, particularly, also readier and more economical workability when mixed with a suitable vehicle as for instance oil when employed in paint.

In my Letters Patent No. 1,155,462 (Reissue No. 14289), No. 1,205,144, and No. 1,236,655, I have disclosed processes whereby composite titanic oxide pigment products can be made by adding to a titanic sulphate solution a compound capable of forming, by reaction with such solution, an insoluble sulphate, thus supplying to the solution the requisite carrier particles by forming them by aid of chemical reactions with the solution itself; heating to precipitate upon said carriers titanium compounds in the form of either metatitanic acid or of basic titanic sulphate; withdrawing the composite precipitate and calcining it.

In my workings of these earlier processes involving the production of the sulphate carrier particles by their precipitation in the same tank as and with the titanic particles, I adjusted the conditions more particularly with reference to the precipitation of the latter so as to yield final products of certain composition and properties. I have now discovered that I can make a composite titanic oxide-barium sulphate-pigment product having greater and exceptional hiding power and other distinctive physical properties by so operating as to produce the barium sulphate under more favorable conditions, i. e. by a preliminary precipitation thereof in another than the titanic solution, and its thereafter addition to the latter for the carrier purposes mentioned.

For example: By adding a solution of sodium sulphate to a solution of barium sulphide, such solutions being of the proper concentration and temperature, barium sulphate is, in a very finely divided, or colloidal condition, precipitated, and sodium sulphide is formed, the solution being alkaline. This colloidal barium sulphate thus precipitated appears to be in a dispersed, or relatively loosely aggregated, i. e. spongelike, condition as distinguished from the more compact structure of other barium sulphate products precipitated from acid solutions, such, for example, as those of my hereinbefore referred to patents and to contain associated therewith a non-negligible amount of a fixed alkali compound.

These artificially produced, dispersed barium sulphate products are readily distinguished from more compact varieties by microscopic examination, and also by their property of sintering and contracting slightly when heated to 600° C. to 800° C.

The foregoing, and other, methods for obtaining such dispersed barium sulphate products are known, such products being now in the market.

To the peculiar properties of such barium sulphates, including particularly those above mentioned, I attribute largely the exceptional hiding power and other peculiar physical qualities of my composite pigments containing them as an integrated component or constituent. The porous, or sponge-like, structure of such barium sulphate, i. e. in the said aggregations of relatively dispersed particles, presents a comparatively large receptive surface for subsequent precipitation thereon of the titanium compounds and the latter can also importantly permeate the porosities of such aggregations. Upon subsequent calcination of the thus produced composite titanic product, some sintering, and contraction, occurs, resulting in a pigment which comprises coherent agglomerations of barium sulphate particles which are not only coated externally, but also more or less interstitially impregnated with particles of titanic oxide which are adherent to the crystalline particles of barium sulphate.

An essential feature of my present novel process is that the barium sulphate therein employed, shall, from whatever source obtained, have the characteristics above described; and that therefore it must be prepared as a separate step or detail of the operation of my present invention i. e. under conditions such as to yield such product.

My present invention is practiced as follows: Barium sulphate of the type specified preliminarily prepared or purchased as above, and either in dry form, or as a pulp obtained by separating it, as by filtration or decantation, I charge, as such, into a titanic solution prepared, for example as described, though preferably somewhat more concentrated than in my above referred to patents, and in quantities as may be indicated by the desired composition of the final pigment products. The charge is then heated to precipitation of basic titanic sulphate, the particles of which, as precipitated, adhere to, coalesce with, and also, under the above stated conditions, impregnate the, as aforesaid, preliminarily artificially obtained and mechanically added, dispersed aggregations of barium sulphate particles. The resulting conglomerations composed of titanic precipitates coalesced with the barium sulphate carriers are then separated by filtration, dried and calcined to complete decomposition of their titanium compounds to titanic oxide. During the calcination there is imparted to these particular hitherto dispersed beraium sulphate carriers a more or less contracted or completely closed structure. And I have found, by analysis, that the said calcined pigment products of my above described novel process also contain an important content of the above referred to fixed alkali compound, this being, in the above given example of my present process, sodium sulphate, the presence of which in the barium sulphate used seems to have been instrumental in imparting to my pigment greater hiding power than possessed by other titanic-barium sulphate pigments which do not contain such content of a fixed alkali compound. The composite pigment product of my herein described novel process not only has exceptionally great hiding power, but its physical structure is different from analogous products prepared by precipitation of titanium compounds, in the referred to solutions of my said previous patents, (including also No. 1,240,405, dated September 18th, 1917,) upon the hitherto employed therein precipitated crystalline, or other relatively dense or compact forms of barium sulphate. The difference in structure of my new composite titanic oxide pigment product is particularly noticeable from its behavior when ground with linseed oil, to paste form, preliminarily to its employment in making paint. When thus ground with linseed oil, there is required to grind to a soft smooth paste only 70% to 75% of the oil required to grind a titanium pigment product of the same chemical composition but made, as heretofore, from other forms of barium sulphate. The lesser oil absorption, and consequently more easily workable properties, are desirable, and greatly appreciated by paint manufacturers.

Having now described my invention, what I claim as new and desire to secure by Letters Patent is the following, viz:

1. The method of making composite titanic oxide products which comprises charging preliminarily artificially prepared barium sulphate into a titanic sulphate solution, heating the solution to precipitation therein of a titanic compound, withdrawing the resulting conglomerations of said compound with the barium sulphate, and calcining them.

2. The method of making composite titanic oxide products which comprises charging preliminarily artificially prepared barium sulphate into a titanic sulphate solution, heating the solution to precipitation therein of basic titanic sulphate, withdrawing the resulting conglomerations of said sulphates, and calcining them.

3. The method of making composite titanic oxide products which comprises the following steps, viz: first, obtaining barium sulphate as by formation and precipitation thereof in an alkaline solution, next, adding the barium sulphate so obtained to a titanic sulphate solution, heating the solution to precipitation therein of a titanic compound, withdrawing the resulting conglomerations of said compound with said barium sulphate, and calcining them.

4. The method of making composite titanic oxide products which comprises the following steps, viz: first obtaining barium sulphate as by formation and precipitation thereof in an alkaline solution, next, adding the barium sulphate so obtained to a titanic sulphate solution, heating the solution to precipitation therein of basic titanic sulphate, withdrawing the resulting conglomerations of said sulphates, and calcining them.

5. In the production of composite titanic oxide pigment products from a titanic sulphate solution, the steps which consist in obtaining barium sulphate apart from said solution, adding the barium sulphate so obtained to the titanic sulphate solution, and, in said solution, precipitating a titanic compound in presence of the, as aforesaid, separately obtained and thereto added barium sulphate.

6. The composite titanic oxide pigment product comprising barium sulphate, titanic oxide, and a fixed alkali compound.

7. The composite titanic oxide pigment product comprising barium sulphate, titanic oxide and sodium sulphate.

8. The composite titanic oxide pigment product consisting essentially of carrier particles of barium sulphate having therewith coalesced and thereto externally and interstitially adherent particles of titanic oxide and containing also a relatively small quantity of a fixed alkali compound.

LOUIS E. BARTON.

Witnesses:
CHARLOTTE L. OSTERTAG,
TOM C. GRAHAM.